Dec. 3, 1935.　　　　J. S. PARSONS　　　　2,023,097
NETWORK SYSTEM OF DISTRIBUTION
Filed Jan. 14, 1933　　　3 Sheets-Sheet 1

WITNESSES:
R. S. Williams
Geo. O. Harrison

INVENTOR
John S. Parsons
BY
ATTORNEY

Dec. 3, 1935.　　　　J. S. PARSONS　　　　2,023,097
NETWORK SYSTEM OF DISTRIBUTION
Filed Jan. 14, 1933　　　3 Sheets-Sheet 2

WITNESSES:
R. S. Williams
Geo. O. Harrison

INVENTOR
John S. Parsons
BY
ATTORNEY

Dec. 3, 1935.　　　　J. S. PARSONS　　　　2,023,097
NETWORK SYSTEM OF DISTRIBUTION
Filed Jan. 14, 1933　　　3 Sheets-Sheet 3

WITNESSES:
R. S. Williams
Geo. O. Harrison.

INVENTOR
John S. Parsons
BY
ATTORNEY

Patented Dec. 3, 1935

2,023,097

UNITED STATES PATENT OFFICE 2,023,097

NETWORK SYSTEM OF DISTRIBUTION

John S. Parsons, Swissvale, Pa., assignor to Westinghouse Electric & Manufacturing Company, East Pittsburgh, Pa., a corporation of Pennsylvania Application January 14, 1933, Serial No. 651,689

8 Claims. (Cl. 175—294)

My invention relates to protective apparatus for use in distribution systems and particularly to automatic protectors for controlling the connection and disconnection of power circuits in response to electrical conditions thereof.

Although not limited thereto, my invention is particularly applicable to automatic protectors for use in distribution systems of the network type, in which a distribution network is supplied by means of a plurality of feeders from the same or different sources.

It is an object of my invention to provide a novel network protector in which a two-element voltage balance relay shall be provided for comparing the magnitudes of feeder and network voltages, and in which the power-directional relay ordinarily provided shall be used with rotated closing characteristics to compare the phase relationship of feeder and network voltages during the closing operation.

A further object of my invention is to provide a novel network protector for controlling the connection of polyphase alternating-current feeder and network circuits which shall operate to compare the phase relationship of a plurality of phases of feeder and network voltage during the closing operation.

Other objects of my invention will become evident from the following detailed description taken in conjunction with the accompanying drawings, in which Figure 1 is a diagrammatic view of a network protector embodying my invention.

Figure 1:
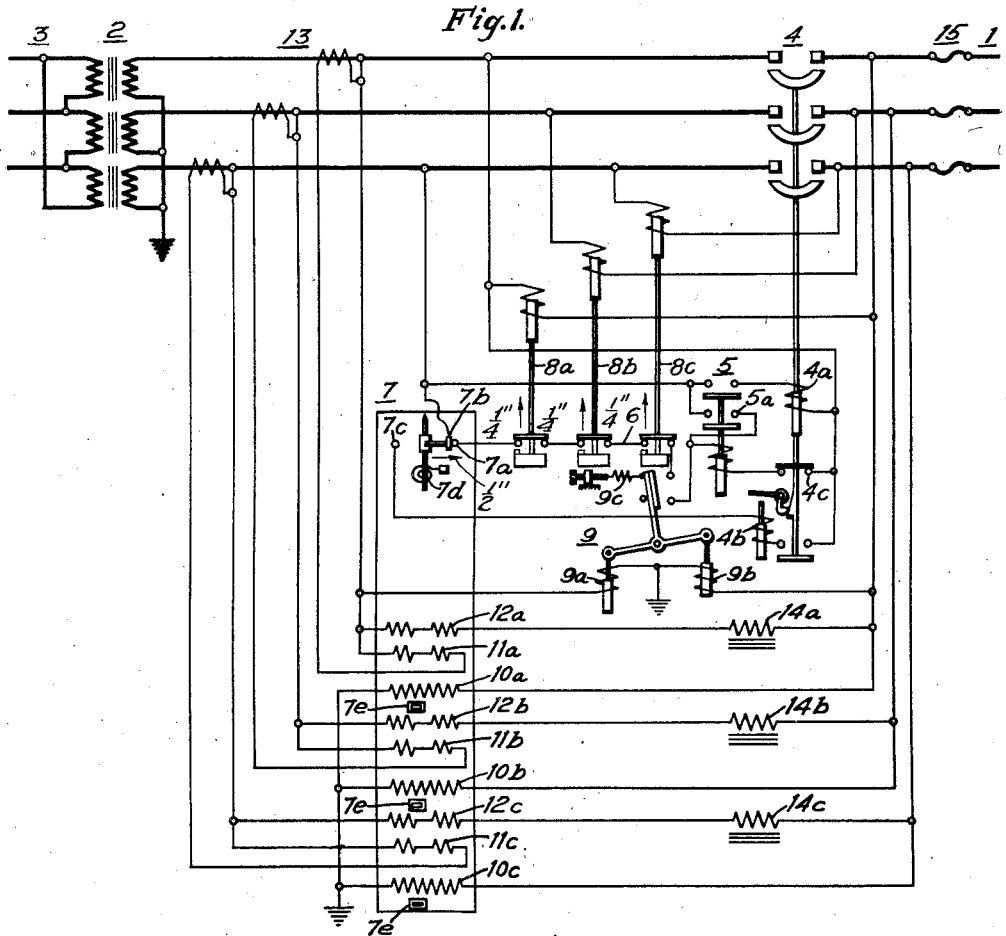

Referring to Fig. 1 in detail, a distribution network 1 is connected by means of a bank of transformers 2 to a feeder 3 to be energized therefrom. The transformer bank 2 is shown connected in delta on the feeder side and in star with neutral grounded on the network side, but may be connected in other ways known in the art. Although only one feeder 3 and one bank of transformers 2 are shown in the drawings, it will be understood that in a commercial network system, the network would be energized by means of a plurality of feeders 3, each connected to the network by means of a plurality of banks of transformers, in the usual manner.

A protector circuit breaker 4 is interposed between the secondary windings of the transformer bank 2 and the network 1 for controlling the connection and disconnection of the feeder 3 and the network 1. The circuit breaker 4 is preferably of the latched-closed type, and is provided with a closing coil 4a and a trip coil 4b.

A relay 5, of the contactor type, is provided for controlling the closing coil 4a of the circuit breaker 4. The operating coil of the relay 5 is connected in a closing circuit 6 which includes a closing contact member 7a of a polyphase power-directional relay 7, the contact members of a set of voltage responsive relays 8a, 8b and 8c, the contact members of a voltage-responsive balance relay 9, and back auxiliary contact members 4c of the circuit breaker 4. The relay 5 is provided with auxiliary contact members 5a for establishing a holding circuit for itself, independent of contact members of the power-directional relay 7, the voltage-responsive relays 8a, 8b or 8c, or the balance relay 9.

The polyphase power-directional relay 7 may be of any suitable induction-disc type for network service, preferably having separate phasing windings in addition to the usual current and potential windings, and having over-voltage adjusting loops or equivalent biasing means acting in the tripping direction when the potential windings are energized. As such relays are well known in the art, detailed description and illustration of the constructional features are omitted, and the relay 7 is shown diagrammatically.

The polyphase relay 7 is provided with a movable contact member 7b operable to engage the closing contact member 7a for completing the closing circuit 6, or to engage a tripping contact member 7c for energizing the trip coil 4b of the circuit breaker 4, dependent upon the angular position of the relay induction-disc assembly (not shown). A spiral spring 7d is provided for biasing the movable contact member 7b into engagement with the closing contact member 7a.

The potential windings of the polyphase relay 7 are shown at 10a, 10b and 10c, connected to respond to the star voltages of the network 1, and the current windings are shown at 11a, 11b and 11c, connected to a bank of current transformers 13 to be energized in accordance with the secondary line currents of the transformer bank 2 in the usual manner.

The polyphase relay 7 is provided with phasing windings 12a, 12b and 12c, connected in series with reactors 14a, 14b and 14c, respectively, across the corresponding main contact members of the circuit breaker 4. The purpose of the reactors 14a, 14b and 14c is to cause the current in the phasing windings 12a, 12b and 12c to lag the voltage across the corresponding main contact members of the circuit breaker 4 a sufficient amount to rotate the closing characteristic curve of the relay 7 through a large angle such as 80° from the horizontal.

The over-voltage adjusting loops of the polyphase relay 7 are shown diagrammatically at 7e. These loops are preferably of the usual type comprising flat adjustable shading coils interposed between the potential poles and induction discs (not shown) of the relay 7. The loops 7e operate to shade part of the potential pole flux, to thereby produce a biasing torque opposite to and slightly greater than the torque produced by the spring 7d, when the potential windings 10a, 10b and 10c are energized.

The voltage-responsive relays 8a, 8b and 8c are connected across the a, b and c phase main contact members of the circuit breaker 4, respectively. The operating coils of these relays are of comparatively high impedance for limiting the voltage which can be developed on the feeder side of the transformer bank 2 when the feeder 3 is disconnected at the supply end, the circuit breaker 4 is open, and the network 1 is energized. The relays 8a, 8b and 8c are designed to open their contact members in response to a voltage of from 60% to 80% of the normal line-to-neutral voltage of the network 1 and to withstand full line-to-neutral voltage continuously without excessive over-heating.

The opening operation of the relays 8a, 8b and 8c is retarded in any suitable manner, as by relay design or by means of auxiliary retarding devices, shown as dashpots, so that these relays operate with a time element greater than the time required for closure of the voltage-responsive balance relay 9 and the relay 5, but less than the minimum time required for engagement of the contact members 7a and 7b of the relay 7 when the latter is biased to open position by the action of the over-voltage adjusting loops 7e. For example, if the relays 5 and 9 are of instantaneous type, and the relay 7 requires a minimum of ½ second to close during a phasing operation, the relays 8a, 8b and 8c may be delayed for about ¼ second in opening, as indicated by arrows in Fig. 1.

The voltage-responsive balance relay 9 may be of any suitable type having a pair of voltage-responsive elements and an armature member controlled by differential action of the voltage-responsive elements. In the form shown, the relay 9 comprises a pair of balanced plunger type elements 9a and 9b. The element 9a is energized in accordance with a line-to-neutral secondary voltage of the transformer bank 2 and tends to cause closure of the relay contact members. The element 9b is energized in accordance with a line-to-neutral voltage of the network 1 and tends to cause opening of the relay contact members. An adjustable spring 9c is provided for exerting a biasing force on the armature of the relay 9, acting in the opening directions and corresponding in value to a voltage of the order of one volt applied to the coil 9a.

A set of fuses 15 is provided for protecting the transformer bank 2 against destructive currents of such phase-relationship as compared to the network voltage that the power directional relay 7 may not operate.

The operation of the apparatus described above may be set forth as follows: It is assumed that initially the network 1 and feeder 3 are deenergized, the circuit breaker 4 is open and the various relays are in the positions shown in Fig. 1. If the feeder 3 is first energized, a voltage is impressed upon the element 9a of the balance relay 9, but no voltage is impressed upon the element 9b. The element 9a accordingly acts unopposed to cause the closure of the relay 9.

At the same time, the secondary star voltages of the transformer bank 2 act through the coils of the relays 8a, 8b and 8c and in parallel through its potential windings 10a, 10b and 10c, and any translating devices connected to the deenergized network 1, to produce currents in the coils of the relays 8a, 8b and 8c. If the translating devices connected to the deenergized network 1 represent a comparatively high admittance, substantially the full secondary line-to-neutral voltages of the transformer bank 2 are applied to the coils of the relays 8a, 8b and 8c. However, because of their time elements, the relays 8a, 8b and 8c do not immediately open.

Upon closure of the relay 9, the closing circuit 6 is completed and the relay 5 closes substantially instantaneously. The relay 5 in closing, completes a holding circuit for itself through its contact members 5a and completes an energizing circuit for the closing coil 4a of the circuit breaker 4. The circuit breaker 4 accordingly closes to energize the network 1 and to short-circuit the coils of the voltage-responsive relays 8a, 8b and 8c and the phasing windings 12a, 12b and 12c of the polyphase relay 7.

If a fault occurs on the network 1, the circuit breaker 4 remains closed and the fault is burned clear in the usual manner.

Assuming that the network 1 is energized by means of other sources (not shown), if a fault occurs on the feeder 3, the direction of power flow reverses and power is fed from the network 1 through the transformer bank 2 to the fault. In response to the reversed power flow, the relay 7 operates in a well known manner to energize the trip coil 4b of the circuit breaker 4 and thereby cause the latter to open.

When the fault on feeder 3 has been cleared, and feeder voltage has been restored, the reclosure of the circuit breaker 4 depends upon the relative magnitudes and phase relationship of the secondary voltage of the transformer bank 2 and the voltage of the network 1, assuming that the network has remained energized.

Figure 2:
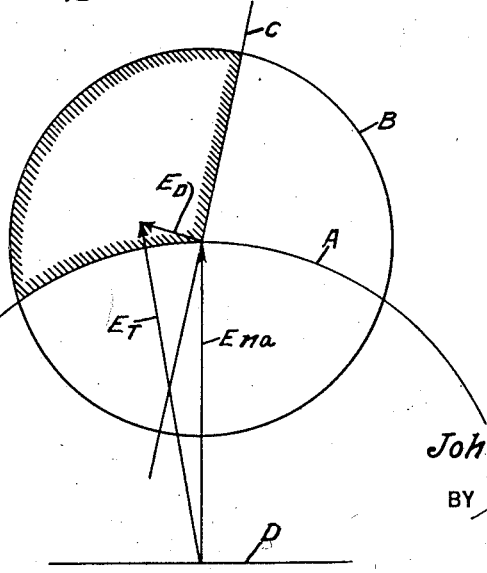
Fig. 2 is a vector diagram illustrating the characteristics of the protector shown in Fig. 1.

Referring to Fig. 2, the a-phase line-to-neutral voltage of the distribution network 1 is denoted by the vector $E_{na}$. As the operation of the balance relay 9 depends solely upon the relative magnitudes of transformer secondary and network voltages, the closing characteristics of this relay is a circle concentric with the origin, indicated at A. Any transformer secondary voltage which may be represented by a vector terminating outside of the circle A will effect closure of the relay 9.

The opening characteristic of the a-phase voltage responsive relay 8a may be similarly represented by a circle B. However, in this case, as the relay 8a responds to the voltage existing across the open circuit breaker contact members, the circle B is concentric with the end of the vector $E_{na}$.

The closing characteristic of the polyphase relay 7, which is rotated approximately 80° from the horizontal, is shown at C. The opening curve of relay 7 is shown at D.

The limiting locus of transformer secondary voltages which can effect closure of the balance relay 9 and the polyphase relay 7 without causing the opening of the voltage-responsive relay 8a is accordingly defined by the curves A, B and C, and the corresponding closing area for the circuit breaker 4 is shown shaded in Fig. 2.

Assuming that the secondary voltage of the transformer bank 2 is such that the corresponding vector $E_T$ (Fig. 2) terminates within the shaded area, the balance relay 9 and the polyphase relay 7 operate to complete the closing circuit 6 to thereby cause the circuit breaker 4 to close in the manner described above.

It will be apparent from inspection of Fig. 2 that the difference voltage $E_D$ which can effect closure of the circuit breaker 4 must lie within the range of approximately 100° leading to 10° lagging with reference to the network voltage $E_{na}$. Assuming for simplicity that all feeders are energized from the same bus, it may be shown that the current which flows at the instant of closure of the circuit breaker 4 depends upon the difference voltage $E_D$ and an impedance determined principally by the constants of the loop circuit completed by the incoming feeder and the connected feeders. As the phase position of the difference voltage $E_D$ depends upon the phase angle of the load impedance of the network 1, the direction of power flow will be normal for load impedances whose phase angle lies between approximately 10° lag and 80° lag. As the phase angle of the load impedance encountered in practice ranges from 30° to 80° lag, the protector is pump-proof for such load impedances.

Assuming that the network 1 is energized, the circuit breaker 4 is open and that in repairing a feeder fault two conductors of the feeder 3 have been interchanged or that all three feeder conductors have been incorrectly connected, the operation may be set forth as follows: As the network 1 is energized, the potential windings 10a, 10b and 10c and the over-voltage adjusting loop 7e cooperate to produce a biasing torque in the relay 7 which maintains the movable contact member 7b out of engagement with the closing contact member 7a.

Upon restoration of the voltage of feeder 3, a voltage of at least line-to-neutral value appears across one or more of the open main contact members of the circuit breaker 4, because of the incorrect feeder connections. In response to this voltage, one or more of the voltage-responsive relays 8a, 8b and 8c operates to open position at the expiration of its time interval.

If one or more of the secondary voltages of the transformer bank 2 existing under these conditions is leading as compared with the corresponding network voltage, a closing torque may be produced in the relay 7. However, as the time interval required for engagement of the contact members 7a and 7b is greater than the time elements of the relays 8a, 8b or 8c, the closing circuit 6 cannot be completed, and the circuit breaker 4 remains open.

Figure 3:
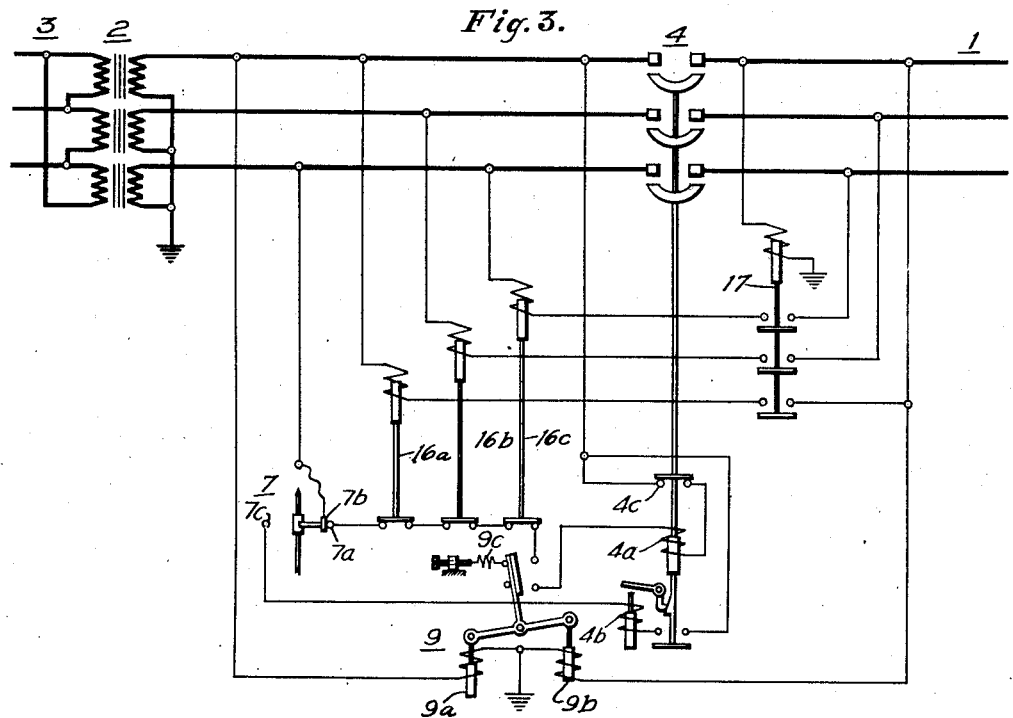
Fig. 3 is a diagrammatic view of the control circuits of a modified protector embodying my invention.

Referring to Fig. 3, a modification of my invention is shown therein in which instantaneous type relays 16a, 16b and 16c are substituted for the time element relays 8a, 8b and 8c of Fig. 1. The relays 16a, 16b and 16c are similar in all respects to the relays 8a, 8b and 8c of Fig. 1, except that they operate substantially without time delay. The circuit breaker 4, power-directional relay 7, balance relay 9 and transformer bank 2 are constructed and connected in the same manner as the corresponding elements of Fig. 1. Several elements of the Fig. 3 modification, such as the windings of the relay 7 and their associated connections, which are identical with the corresponding elements of Fig. 1, have for simplicity been omitted from the drawings. No relay of the contactor type corresponding to the relay 5 of Fig. 1 is necessary in the Fig. 3 modification.

A voltage-responsive relay 17 is provided for controlling the circuits of the operating coils of the relays 16a, 16b and 16c. The voltage-responsive relay 17 is preferably connected between a phase conductor of the network 1 and ground and is designed to close in response to a voltage of the order of 85% of the normal line-to-neutral voltage of the network 1.

The operation of the apparatus shown in Fig. 3 may be set forth as follows: When the network 1 is deenergized, the relay 17 is open thereby preventing energization of any of the relays 16a, 16b or 16c. When the feeder 2 is energized, the balance relay 9 operates to cause closure of the circuit breaker 4 in the manner described above in connection with Fig. 1.

When the network 1 is energized and the feeder 2 is disconnected at the supply end, the relay 17 is closed and substantially full line-to-neutral voltage is applied to the relays 16a, 16b and 16c. The latter relays accordingly open. When the voltage of feeder 3 is restored, the voltages applied to the relays 16a, 16b and 16c become negligible if the phase sequence of secondary voltages of the transformer bank 3 is correct as compared with the voltages of the network 1. The relays 16a, 16b and 16c accordingly drop out, and closure of the circuit breaker 4, under proper voltage conditions, is effected by the polyphase relay 7 and the balance relay 9, as described above in connection with Fig. 1.

If, because of incorrect connections of the feeder 2, the voltages appearing at the secondary terminals of the transformer bank 3 are of incorrect phase relationship, as compared with the voltages of the network 1, one or more of the relays 16a, 16b and 16c remains open to prevent closure of the circuit breaker 4.

Figure 4:
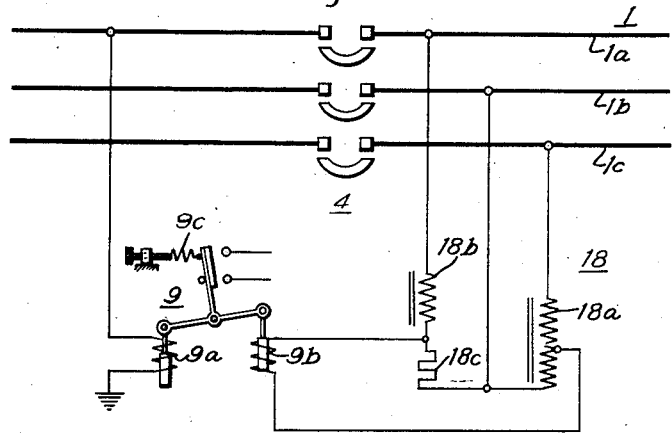
Fig. 4 is a diagrammatic view showing modified energizing connections for a relay used in the practice of my invention.

Fig. 4 shows alternative energizing connections for the balance relay 9 which may be used in any of the modifications shown. Referring to Fig. 4, one of the voltage-responsive elements of the relay 9, such as the element 9a, is energized in accordance with a line-to-neutral voltage on the feeder side of the circuit breaker 4 as in Fig. 1. The other voltage-responsive element 9b, is connected to a phase-sequence filter 18, to be energized in accordance with a positive symmetrical component of the polyphase voltage on the network side of the circuit breaker 4. As, in some applications, the voltage of the incoming feeder is that of an unloaded generator, it is substantially balanced and a single phase serves as a sufficiently accurate index of the polyphase feeder voltage. The network voltage, however, may be somewhat unbalanced because of unbalanced load. The phase sequence filter 18 is accordingly used on the network side to obtain an indication of the polyphase network voltage.

The phase-sequence filter 18 may be of any well known type for separating a positive symmetrical component from a polyphase system of voltage. In the embodiment shown, the filter 18 consists of an autotransformer 18a having a 40% tap, a reactor 18b and a resistor 18c. The constants of the reactor 18b and resistor 18c are so related that the voltage drop across the resistor 18c is equal to 40% of the total voltage impressed on the reactor 18b and resistor 18c in series and lags the latter voltage by a phase angle of 60°.

Assuming that the terminals of the filter 18 are connected to the phases of the network 1 in the order indicated by the subscripts a, b and c of the network conductors 1a, 1b and 1c, the voltage applied to the voltage-responsive element 9b is proportional to the positive symmetrical components of network voltage. The design of the relay 9, in this embodiment, is so modified that the moments exerted on the relay armature by the elements 9a and 9b are equal when equal polyphase voltages exist on either side of the circuit breaker 4.

Figure 5:
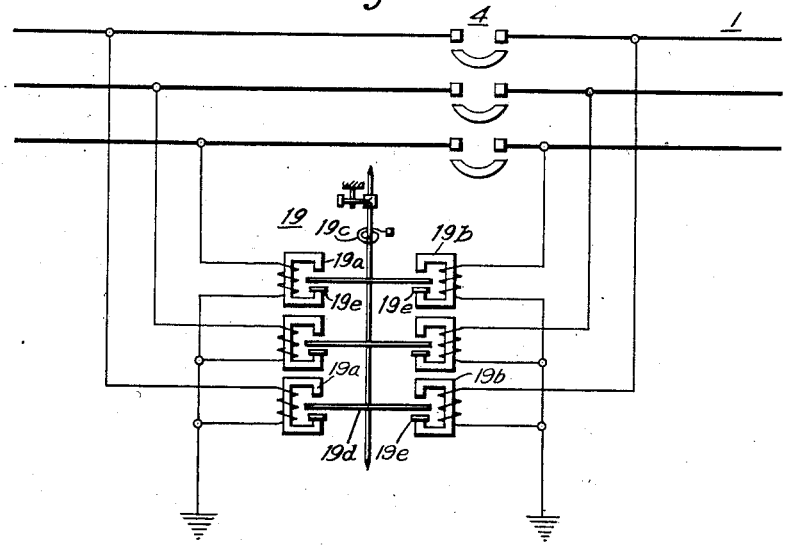
Fig. 5 is a diagrammatic view of a three-phase voltage balance relay and associated connections, which may be used in the practice of my invention.

Fig. 5 shows an induction-type voltage-responsive balance relay 19 which may be used as a substitute for the balance relay 9 shown in other figures. In the Fig. 5 modification, an induction disc assembly 19d is controlled jointly by a set of driving magnets 19a, energized in accordance with the line-to-neutral voltages on the transformer side of the circuit breaker 4, and a set of driving magnets 19b energized in accordance with the line-to-neutral voltages on the network side of the circuit breaker 4. Each of the driving magnets 19a and 19b is provided with suitable means for producing a quadrature flux component, shown as a shading coil 19e mounted to interlink part of the flux produced by the driving magnet. The driving magnets 19a tend to close the relay contact members, and the driving magnets 19b tend to open them. A biasing spring 19c is provided for the same purpose as the spring 9c of Fig. 1.

Figure 6:
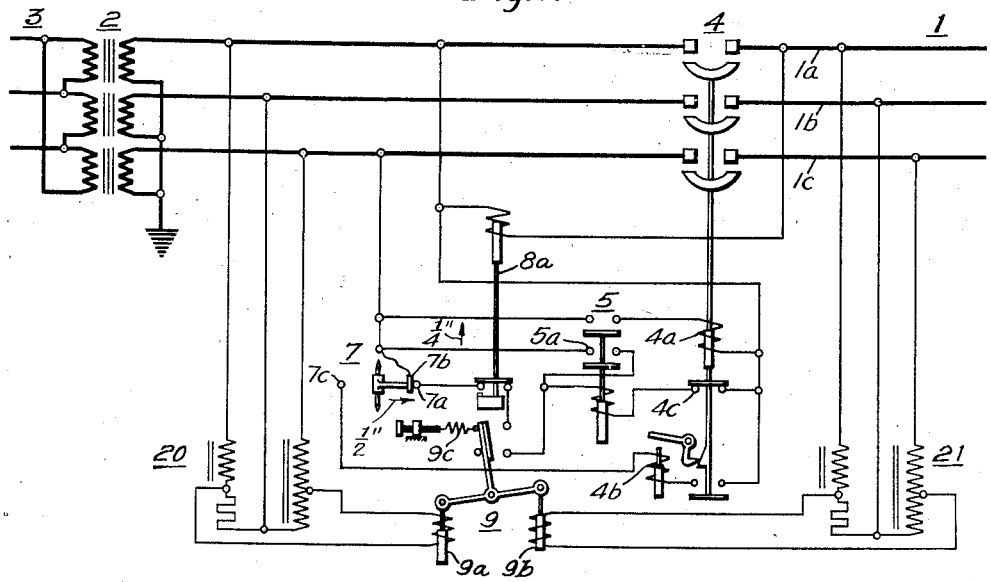
Fig. 6 is a diagrammatic view of the control circuits of a modified protector embodying my invention.

Referring to Fig. 6, which shows the control circuits of a modified protector embodying my invention, the network 1, transformer bank 2, circuit breaker 4, contact-type relay 5, power directional relay 7 and voltage responsive relay 8a are constructed and connected in the same manner as the corresponding elements of Fig. 1. The voltage-responsive relays 8b and 8c of Fig. 1 are omitted however, and the balance relay 9 is energized by means of a pair of positive phase-sequence voltage filters 20 and 21 which may be identical with the filter 18 described above in connection with Fig. 4.

In the Fig. 6 modification, the filter 20 prevents closure of the circuit breaker 4 when the network 1 is energized and any two conductors of the feeder 3 have been interchanged. Under these conditions, the phase-sequence of secondary voltages of the transformer bank 2 is reversed and the voltage applied to the element 9a of the balance relay 9 is substantially zero. The relay 7 prevents closure of the circuit breaker 4 in the event that all three phases of voltage of the feeder 3 are rotated 240° in the counter-clockwise direction. The voltage-responsive relay 8a protects against the single case in which all three phases of voltage of the feeder 3 are rotated 120° in the counter-clockwise direction and the network 1 is energized.

Under the latter conditions, the phase-sequence of secondary voltages of the transformer bank 2 is normal and full voltage is applied to the elements 9a of the balance relay 9. The line-to-neutral voltages on the transformer side of circuit breaker 4 lead the line-to-neutral voltages on the network side of the circuit breaker by 120°, producing a closing torque in the polyphase relay 7. However, before the relay 7 operates to closed position, the relay 8a opens in response to the line-to-line voltage applied to its operating coil and prevents closure of the circuit breaker 4.

The operation of the apparatus shown in Fig. 6 will otherwise be obvious from that described above in connection with Fig. 1.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a network distribution system, an alternating-current supply circuit, an alternating-current load circuit, a circuit breaker for controlling the connection and disconnection of said circuits, a balance relay having an element responsive to a voltage condition of said supply circuit and an element responsive to a voltage condition of said load circuit and having contact means operable in response to differential action of said elements, a power-directional relay responsive to a predetermined directional power condition of said circuits when said circuit breaker is closed and responsive to a predetermined vector relationship of voltage conditions of said circuits when said circuit breaker is open, means controlled by said contact means and said power-directional relay for effecting the closure of said circuit breaker and means controlled by said power-directional relay for effecting the opening of said circuit breaker.

2. In an automatic network protector for controlling the connection and disconnection of a polyphase alternating current supply circuit and a polyphase alternating-current load circuit, a circuit breaker, control means for said circuit breaker including a relay having an element responsive to a voltage condition of said supply circuit and an element responsive to a voltage condition of said load circuit, said relay being effective to prevent closure of said circuit breaker except when the absolute value of said voltage condition of said supply circuit bears a predetermined relationship to the absolute value of said voltage condition of said load circuit, and a polyphase relay responsive to a polyphase vector relationship of the voltages of said circuits dependent in part at least upon the phase relationships of the polyphase voltages of said circuits for effecting the closure of said circuit breaker when a predetermined phase relationship exists between the polyphase voltages of said circuits and said first-mentioned relay is ineffective to prevent closure of said circuit breaker, said predetermined phase relationship being such as to prevent power flow from said load circuit to said supply circuit upon closure of said circuit breaker when the impedance phase angle of said load circuit is within predetermined normal limits.

3. In an automatic network protector for controlling the connection and disconnection of an alternating-current supply circuit and an alternating-current load circuit, a circuit breaker, control means for said circuit breaker including a relay having an element responsive to a voltage condition of said supply circuit and an element responsive to a voltage condition of said load circuit, said relay being effective to prevent closure of said circuit breaker except when the absolute value of said voltage condition of said supply circuit bears a predetermined relationship to the absolute value of said voltage condition of said load circuit, and a relay responsive to a difference voltage of said circuits for preventing closure of said circuit breaker when said difference voltage exceeds a predetermined value.

4. In an automatic network protector for controlling the connection and disconnection of a pair of polyphase alternating-current circuits, a circuit breaker, control means for said circuit breaker including a relay having a pair of voltage-responsive elements, means for energizing one of said elements in accordance with a positive symmetrical component of the polyphase voltage of one of said circuits, means for energizing the other of said elements in accordance with a voltage condition of the other of said circuits, said relay being effective to prevent closure of said circuit breaker except when said positive symmetrical component bears a predetermined relationship to said voltage condition, and a relay responsive to a difference voltage of said circuits for preventing closure of said circuit breaker when said difference voltage exceeds a predetermined value.

5. In an automatic network protector for controlling the connection and disconnection of a polyphase alternating-current supply circuit and a polyphase alternating-current load circuit, a circuit breaker, a relay having a pair of voltage-responsive elements, means for energizing one of said elements in accordance with a positive symmetrical component of the polyphase voltage of said supply circuit, means for energizing the other of said elements in accordance with a positive symmetrical component of the polyphase voltage of said load circuit and control means for said circuit breaker including means controlled by said elements for preventing closure of said circuit breaker except when said positive symmetrical component of the polyphase voltage of said supply circuit bears a predetermined relationship to said positive symmetrical component of the polyphase voltage of said load circuit.

6. In a distribution system, a pair of grounded neutral alternating-current power circuits, a circuit breaker for controlling the connection and disconnection of said circuits, means for automatically controlling the closure of said circuit breaker including relay means responsive to the relative magnitudes of a voltage condition of each of said circuits regardless of the phase relationship of said voltage conditions, induction relay means responsive to a vector relationship of the line-to-neutral voltages of said circuits dependent in part at least on the phase relationship of said line-to-neutral voltages, and relay means responsive to a difference voltage of said circuits, whereby the closing condition of said circuit breaker is determined by the relative magnitudes of said voltage conditions of said circuits, the phase relationship of the line-to-neutral voltages of said circuits and the magnitude of a difference voltage of said circuits.

7. In a distribution system, a pair of alternating-current power circuits, a circuit breaker for controlling the connection and disconnection of said circuits, a relay having a pair of elements independently responsive to the voltages of said circuits and having contact means operable in response to differential action of said elements, a power-directional relay responsive to a predetermined directional power condition of said circuits when said circuit breaker is closed and responsive to a predetermined vector relationship of the voltages of said circuits when said circuit breaker is open, a voltage responsive relay energized in accordance with a difference voltage of said circuits, means including said contact means, said power-directional relay and said voltage responsive relay for controlling the closure of said circuit breaker and means including said power directional relay for controlling the opening of said circuit breaker.

8. In an automatic protector for controlling the connection and disconnection of an alternating current supply circuit and an alternating current load circuit, a circuit breaker, means including a power directional relay for causing said circuit breaker to open in response to a directional power condition of said circuits, voltage-responsive relay means, and means including said power directional relay and said voltage-responsive relay means, for causing said circuit breaker to close when the vector relationship of the voltages of said circuits is such that the voltage of said supply circuit may be represented as a vector which terminates in an area bounded by a circle concentric with the end of a second vector corresponding to the voltage of said load circuit, a circle concentric with a point corresponding to zero voltage and having a radius substantially equal to said second vector, and a line passing through a point substantially co-incident with the end of said second vector, said line being angularly displaced in the lagging direction from the phase position of said second vector.

JOHN S. PARSONS.